June 12, 1956   M. L. COURTER ET AL   2,750,398
RESOLUTION OF CARBONYLICS CONTAINING GASEOUS MIXTURES
Filed Oct. 19, 1953
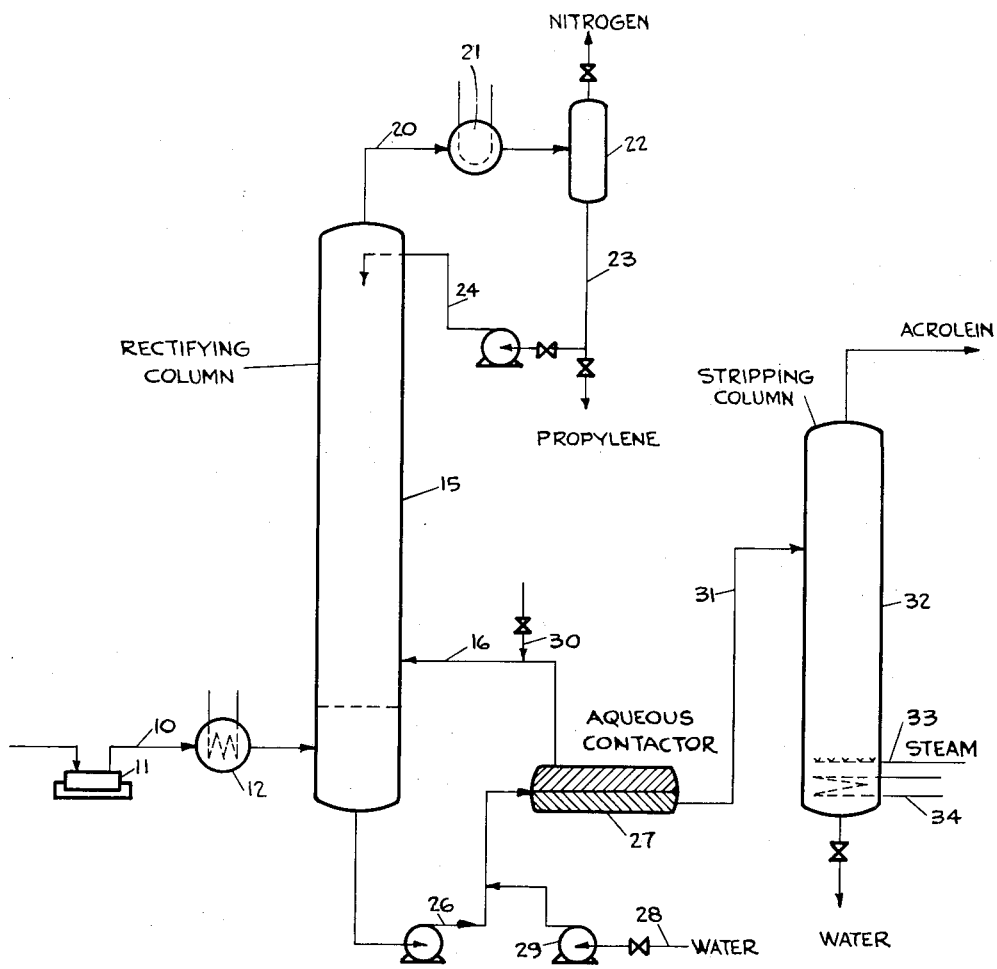
Inventors: Martin L. Courter
Robert L. Magovern
By
Their Agent

United States Patent Office 2,750,398
Patented June 12, 1956

2,750,398

RESOLUTION OF CARBONYLICS-CONTAINING GASEOUS MIXTURES

Martin L. Courter, Walnut Creek, and Robert L. Magovern, El Cerrito, Calif., assignors to Shell Development Company, Emeryville, Calif., a corporation of Delaware Application October 19, 1953, Serial No. 386,809

10 Claims. (Cl. 260—452)

This invention relates to the separation of carbonylic compounds from mixtures comprising them obtained by the oxidation of hydrocarbons. The invention relates more particularly to the separation of alpha,beta-unsaturated carbonylic compounds having from 3 to 4 carbon atoms to the molecule from oxidation products containing them obtained by the oxidation with air of the corresponding hydrocarbons.

A need for the separation of carbonylic compounds from mixtures containing them in admixture with substantial amounts of lower boiling, often normally gaseous, materials is frequently encountered in the chemical industry. Such mixtures are obtained, for example, in the production of carbonylic compounds, such as, for example, alpha,beta-unsaturated carbonylic compounds having from 3 to 4 carbon atoms to the molecule by the molecular oxidation in the presence of suitable catalysts of the corresponding hydrocarbons. Separation of these mixtures by ordinary practical scale fractionating means is generally highly impractical if at all possible. The problem is one of great consequence in those cases where the mixtures are obtained by processes wherein normally gaseous hydrocarbons comprising olefins are oxidized with oxygen, and the oxygen is charged to the system in the form of air. Execution of these processes under the carefully controlled oxidation conditions leading to formation of desired carbonylic compounds will generally result in a reactor effluence consisting predominantly of unconverted normally gaseous reactant and fixed gas, such as nitrogen, and will contain the desired carbonylics in relatively minor amount. Thus, in the production of an alpha,beta-unsaturated carbonylic compound, such as acrolein, by the catalytic oxidation of propylene with oxygen employed in the form of air, there is obtained an effluent stream from the reactor which will consist essentially of unconverted propylene nitrogen unreacted oxygen, and oxides of carbon, and which will contain acrolein-containing carbonylic compounds in relatively minor amount. The ability to separate efficiently at least a substantial proportion of the desired carbonylic materials from such a substantial excess of normally gaseous materials admixed therewith often determines the practicality of the process.

Recent discovery of processes enabling the catalytic oxidation of normally gaseous hydrocarbons under conditions resulting in carbonylics predominating in a desired alpha,beta-unsaturated carbonylic compound has increased the need for processes enabling the recovery of the carbonylics from the reaction products thereby obtained, with efficiency and at a cost commensurate with practical scale operation.

Methods have been disclosed heretofore directed to the obtaining of carbonylics in relatively concentrated form from hydrocarbon oxidation products. In processes disclosed heretofore, however, carbonylics generally are separated from uncondensed reactor effluence by contact with a stream of liquid solvent, such as water or a hydrocarbon, in a scrubbing or extraction zone. Due to the very substantial amounts of normally gaseous materials, including large amounts of fixed gases, present in the reactor effluence, the overhead gas from such a scrubbing or absorption operation will often still contain carbonylic compounds unless an inordinately large quantity of absorbing liquid is used. Since the carbonylic compounds generally constitute only a relatively small portion of the total reactor effluence, even a low concentration of carbonylics in the overhead gas leaving such a scrubbing or absorption tower will represent a substantial part of the total carbonylics produced in the process.

It has now been found that carbonylic compounds comprising, for example, alpha,beta-unsaturated aldehydes and ketones, contained in mixtures resulting from the oxidation of the corresponding hydrocarbons with oxygen employed in the form of air, are separated efficiently from the gaseous reactor effluence in a relatively simple process employing a minimum of operative steps wherein the above difficulties are obviated to at least a substantial degree.

It is an object of the invention to provide an improved process enabling the more efficient separation of carbonylic compounds from mixtures containing them obtained by the oxidation of hydrocarbons with molecular oxygen.

Another object of the invention is the provision of an improved process enabling the more efficient separation of alpha,beta-unsaturated aldehydes and ketones having from 3 to 4 carbon atoms to the molecule from mixtures comprising them obtained by the oxidation with air of corresponding hydrocarbons.

A more particular object of the invention is the provision of an improved process enabling the more efficient separation of acrolein from the total reaction mixtures obtained by the oxidation of hydrocarbons comprising propylene.

A specific object of the invention is the provision of an improved process enabling the more efficient separation of acrolein from propylene in the presence of substantial amounts of nitrogen. Other objects and advantages of the invention will become apparent from the following detailed description thereof made with reference to the attached drawing wherein the single figure illustrates more or less diagrammatically one form of apparatus suitable for carrying out the process of the invention.

In accordance with the present invention a water-soluble carbonylic compound, such as, for example, an alpha,beta-unsaturated aldehyde having from 3 to 4 carbon atoms to the molecule, is separated from a mixture comprising a lower boiling hydrocarbon and fixed gas and containing said carbonylic compound in minor amount, by introducing the mixture into the lower part of a rectifying zone; rectifying said mixture in the rectifying zone, thereby separating a vapor fraction comprising said lower boiling hydrocarbon and fixed gas free of any substantial amount of carbonylic compound from a liquid fraction comprising acrolein and propylene; contacting said liquid fraction with water in a contacting zone, thereby separating a wet hydrocarbon phase from a carbonylic compound-containing aqueous phase in said contacting zone; introducing at least a part of said wet hydrocarbon phase into said rectifying zone at a point above the introduction of the carbonyl-containing charge therein but below the point of introduction of external reflux into said rectifying zone; and separating acrolein from said aqueous phase.

The process of the invention is applied with advantage to the recovery of desirable carbonylic constituents from the total reactor effluence obtained in the catalytic oxidation with air of hydrocarbons, which reactor effluence generally consists predominantly of unconverted hydrocarbons and substantial amounts of fixed gases. The invention is applied with particular advantage to the separation of alpha,beta-unsaturated carbonylic compounds having 3 and 4 carbon atoms to the molecule, such as acrolein and methacrolein, from the mixtures obtained by catalytic oxidation of the corresponding olefinic hydrocarbons as disclosed, for example, in U. S. Patent No. 2,451,485. It is of particular value in the separation of acrolein from mixtures comprising acrolein in admixture with propylene and nitrogen as obtained, for example, by the catalytic oxidation of propylene with air.

In order to set forth more clearly the nature of the invention it will be described hereinafter with reference to the attached drawing in its application to the separation of acrolein from admixture with propylene in the presence of a substantial excess of nitrogen. Referring to the drawing, a mixture emanating from an outside source, such as, for example, from a catalytic propylene oxidation zone, comprising a water-soluble carbonylic compound, such as, for example, acrolein in admixture with normally gaseous components consisting essentially of propylene and nitrogen and which mixture consists predominantly of the normally gaseous components, is forced through line 10, provided with compressor 11 and heat exchanger 12, into a rectifying zone comprising, for example, a rectifying column 15. The acrolein-containing mixture is introduced into column 15 at a lower part thereof. A wet hydrocarbon stream consisting essentially of propylene, preferably emanating from within the system as described hereinbelow, is introduced into rectifying column 15 at an intermediate point thereof above the point of introduction of the acrolein charge to the column. Conditions within column 15 are controlled to assure rectification of the components introduced therein with the formation of a normally gaseous overhead fraction consisting essentially of nitrogen and propylene free of any substantial amount of acrolein, and a liquid bottoms fraction consisting essentially of acrolein admixed with propylene.

Suitable means are provided for the maintenance of conditions of rectification within column 15. Such suitable means comprise, for example, compressor 11 in line 10 to enable the maintenance of optimum conditions of pressure within the column, and a heat exchanger 12 to enable the control of the temperature in the column by withdrawal or addition of heat to the charge. Additional means not shown in the drawing may be provided to maintain conditions of temperature and pressure within column 15 assuring rectification of the charge introduced therein. It is to be pointed out, however, that column 15 is a rectifying column dispensing with the need for such equipment as reboilers or the like.

The vapor fraction separated in column 15 is withdrawn therefrom through line 20 provided with cooler 21 and introduced into accumulator 22. In passing through cooler 21 the stream flowing through line 20 is cooled to a temperature sufficiently low to assure the condensation of at least a substantial part of the propylene content thereof. Condensed propylene is drawn from accumulator 22 through valved line 23 and removed from the system as a final product. A part of the propylene stream passing through line 23 is diverted through line 24 into the upper part of column 15 as reflux. When the process of the invention is employed in combination with a propylene oxidation step, propylene taken from the system through line 23 may be passed directly to the oxidation zone.

Liquid bottoms are withdrawn from column 15 and forced through line 26 into an aqueous contacting zone comprising, for example, a chamber 27. Water emanating from an outside source through valved line 28 is forced by means of pump 29 into line 26; the water thus mixing with the liquid bottoms emanating from column 15 in line 26, and passing therewith into chamber 27. Within chamber 27 there is formed an aqueous phase consisting essentially of water and acrolein, and a hydrocarbon phase consisting essentially of propylene containing a minor amount of water. The contents of chamber 27 are permitted to stratify, thereby separating the hydrocarbon phase as a supernatant layer from the aqueous phase. Hydrocarbon phase is withdrawn from chamber 27 and passed through line 16 into column 15. A valved line 30 is provided for the introduction of wet propylene into line 16 from an outside source. In general, the additional introduction of wet propylene from an outside source is found to be not necessary. Aqueous phase is withdrawn from chamber 27 and passed through line 31 into a suitable separating zone comprising, for example, a stripping column 32.

The aqueous acrolein stream is stripped within column 32, thereby separating a vapor fraction consisting essentially of acrolein of high purity from a liquid fraction consisting essentially of water. Suitable means are provided to maintain desired stripping conditions within column 32, such as, for example, a closed heating coil 34, or other suitable means for the introduction of heat into the liquid bottoms, as a line 33 for the introduction of steam from an external source into the lower part of the column. Other means not shown in the drawing may be employed to obtain the desired stripping conditions within column 32.

The efficiency with which a carbonylic compound is separated from mixtures containing it in admixture with a substantial excess of normally gaseous water-insoluble constituents is exemplified by the following example.

*Example*

A predominantly normally gaseous mixture containing nitrogen, propylene and acrolein in a mole ratio of 18:23.8:1, respectively, and a minor amount of water was introduced into the lower part of a rectifying column. A wet propylene stream containing acrolein in a mole ratio of propylene to acrolein of 13.1 to 1 and a minor amount of water was introduced into the rectifying column at an intermediate point thereof above the point of introduction of the acrolein charge thereto. Propylene was returned to the upper part of the rectifying column as reflux. Rectification resulted in the obtaining of a vapor overhead containing nitrogen, propylene and acrolein in a mole ratio of 338:590:1. The liquid bottoms of the rectification containing nitrogen, acrolein and water in the mole ratio of 3.2:2:1 were withdrawn from the column, mixed with an amount of water to result in an aqueous mixture containing a mole ratio of water to total carbonylics plus propylene of 25:1. The resulting mixture was introduced into a chamber wherein it was allowed to stratify thereby forming a wet hydrocarbon layer and an aqueous layer. The wet hydrocarbon layer containing a mole ratio of propylene to acrolein of 13.1 to 1 and a minor amount of water was introduced into the rectifier as described hereinbefore. The aqueous layer contained acrolein, propylene and water in a mole ratio of 8:1:74.3. Acrolein was separated from the aqueous layer by steam stripping. 98% of the acrolein charged was thus recovered as a concentrated acrolein containing no more than 11 mole percent of propylene.

The invention claimed is:

1. The process for separating a carbonylic compound from a mixture containing said carbonylic compound in admixture with lower boiling hydrocarbons and nitrogen which comprises subjecting said mixture to rectification in a rectifying zone, introducing a stream of wet hydrocarbons into said rectifying zone at a point above the point of introduction of said carbonylic compound-containing mixture into said rectifying zone during said rectification, thereby separating a vapor fraction comprising nitrogen and said lower boiling hydrocarbons free of any substantial amount of carbonylics from a liquid fraction comprising said carbonylic compounds and lower boiling hydrocarbons in said rectifying zone, contacting said liquid fraction with water in a contacting zone thereby separating a hydrocarbon phase consisting essentially of said lower boiling hydrocarbons from an aqueous phase consisting essentially of said carbonylic compounds, and recovering carbonylic compounds from said aqueous phase.

2. The process in accordance with claim 1 wherein said carbonylic compounds comprise an alpha,beta-unsaturated carbonylic compound having from 3 to 4 carbon atoms to the molecule, and said mixture containing said carbonylic compounds is obtained by the oxidation of the corresponding hydrocarbons.

3. The process for separating an alpha,beta-unsaturated aldehyde having from 3 to 4 carbon atoms to the molecule from a mixture containing said aldehyde in admixture with lower boiling hydrocarbons having from 3 to 4 carbon atoms to the molecule, which comprises subjecting said mixture to rectification in a rectifying zone, introducing a stream of wet hydrocarbons having from 3 to 4 carbon atoms to the molecule into said rectifying zone at a point above the point of introduction of said aldehyde-containing mixture into said rectifying zone during said rectification, thereby separating a vapor fraction comprising nitrogen and hydrocarbons having from 3 to 4 carbon atoms to the molecule and which is free of any substantial amount of carbonylic compounds from a liqiud fraction comprising said aldehyde in admixture with a portion of said hydrocarbons in said rectifying zone, contacting said liquid fraction with water in a contacting zone, thereby separating a hydrocarbon phase from an aqueous phase consisting essentially of said unsaturated aldehyde and water, and recovering said unsaturated aldehyde from said aqueous phase.

4. The process for separating alpha,beta-unsaturated aliphatic aldehydes comprising acrolein from a mixture containing said aldehydes in admixture with a substantial excess of lower boiling materials predominating in propylene and nitrogen, which comprises subjecting said mixture to rectification in a rectifying zone, introducing a stream of wet hydrocarbons consisting essentially of wet propylene into said rectifying zone at a point above the point of introduction of said mixture into said rectifying zone during said rectification, thereby separating a vapor fraction comprising nitrogen and said hydrocarbon which is substantially free of aldehydes from a liquid fraction comprising said aliphatic aldehydes and a portion of said hydrocarbons in said rectifying zone, contacting said liquid fraction with water in a contacting zone thereby separating a wet hydrocarbon phase from an aqueous phase consisting essentially of an aqueous solution of said aliphatic aldehydes, and separating aliphatic aldehydes from said aqueous phase.

5. The process for separating acrolein from a mixture containing said acrolein in admixture with a substantial excess of propylene and nitrogen, which comprises subjecting said mixture to rectification in a rectifying zone, introducing a stream of wet propylene into said rectifying zone at a point above the point of introduction of said acrolein-containing mixture into said rectifying zone during said rectification, thereby separating a vapor fraction comprising nitrogen and propylene which is substantially free of acrolein from a liquid fraction comprising acrolein and propylene in said rectifying zone, contacting said liquid fraction with water in a contacting zone thereby separating a wet propylene phase from an aqueous phase consisting essentially of aqueous acrolein, and recovering acrolein from said aqueous phase.

6. The process for separating carbonylic compounds from a mixture containing said carbonylic compounds in admixture with a substantial excess of lower boiling materials consisting essentially of lower boiling hydrocarbons and nitrogen, which comprises subjecting said mixture to rectification in a rectifying zone, introducing a stream of wet hydrocarbons obtained within the system as described hereinbelow into said rectifying zone at a point above the point of introduction of said carbonylic compound-containing mixture into said rectifying zone during said rectification, thereby separating a vapor fraction comprising said lower boiling hydrocarbons and nitrogen substantially free of carbonylic compounds from a liquid fraction comprising said carbonylic compounds and lower boiling hydrocarbons in said rectifying zone, contacting said liquid fraction with water in a contacting zone, thereby separating a wet hydrocarbon phase from an aqueous phase consisting essentially of aqueous carbonylic compounds, passing at least a substantial part of said wet hydrocarbon phase from said contacting zone into said rectifying zone as said wet hydrocarbon stream referred to above, and stripping carbonylic compounds from said aqueous phase.

7. The process in accordance with claim 6 wherein said carbonylic compounds are alpha,beta-unsaturated carbonylic compounds having from 3 to 4 carbon atoms to the molecule, and said carbonylic compound-containing mixture is obtained by the oxidation with air of hydrocarbons having 3 and 4 carbon atoms to the molecule.

8. The process for separating an alpha,beta-unsaturated aldehyde having from 3 to 4 carbon atoms to the molecule from a mixture containing said aldehyde in admixture with nitrogen and lower boiling hydrocarbons having from 3 to 4 carbon atoms to the molecule, which comprises subjecting said mixture to rectification in a rectifying zone, introducing a stream of wet lower boiling hydrocarbons obtained within the system as described hereinbelow into said rectifying zone at a point above the point of introduction of said mixture into said rectifying zone during said rectification, thereby separating a vapor fraction comprising nitrogen and said lower boiling hydrocarbons which is substantially free of aldehydes from a liquid fraction comprising said aldehyde in admixture with a portion of said hydrocarbons in said rectifying zone, contacting said liquid fraction with water in a contacting zone, thereby separating a hydrocarbon phase consisting essentially of hydrocarbons comprising hydrocarbons having from 3 to 4 carbon atoms to the molecule and a minor amount of water from an aqueous phase consisting essentially of aqueous solution of said aldehyde, passing at least a substantial part of said wet hydrocarbon phase from said contacting zone into said rectifying zone as said wet hydrocarbon stream referred to above, and stripping said aldehyde from said aqueous phase.

9. The process for separating alpha,beta-unsaturated aliphatic aldehydes comprising acrolein from a mixture containing said aldehydes in admixture with a substantial excess of lower boiling materials predominating in propylene and nitrogen, which comprises subjecting said mixture to rectification in a rectifying zone, introducing a stream of wet hydrocarbons comprising propylene obtained within the system as described hereinbelow into said rectifying zone at a point above the point of introduction of said mixture into said rectifying zone during said rectification, thereby separating a vapor fraction comprising nitrogen and propylene which is free of any substantial amount of aldehydes from a liquid fraction comprising acrolein and propylene in said rectifying zone, contacting said liquid fraction with water in a contacting zone thereby separating a wet hydrocarbon phase consisting essentially of propylene and a minor amount of water from an aqueous phase consisting of aqueous solution of aldehydes comprising arcolein, and stripping aldehydes comprising acrolein from said aqueous phase.

10. The process for separating acrolein from a mixture containing said acrolein in admixture with a substantial excess of propylene and nitrogen, which comprises subjecting said mixture to rectification in a rectifying zone, introducing a stream of wet propylene obtained within the system as described hereinbelow into said rectifying zone at a point above the point of introduction of said acrolein-containing mixture into said rectifying zone during said rectification, thereby separating a vapor fraction comprising nitrogen and propylene which is free of any substantial amount of acrolein from a liquid fraction comprising acrolein and propylene in said rectifying zone, contacting said liquid fraction with water in a contacting zone thereby separating a wet hydrocarbon phase consisting essentially of propylene and water from an aqueous phase comprising aqueous acrolein, passing at least a substantial part of said wet hydrocarbon phase from said contacting zone into said rectifying zone as said wet propylene stream referred to above, and recovering acrolein from said aqueous phase.

References Cited in the file of this patent

UNITED STATES PATENTS

| | | |
|---|---|---|
| 2,334,091 | Herstein | Nov. 9, 1943 |
| 2,410,642 | Farkas et al. | Nov. 5, 1946 |
| 2,606,932 | Cole et al. | Aug. 12, 1952 |
| 2,606,933 | Cole et al. | Aug. 12, 1952 |